United States Patent
Iwane

(10) Patent No.: US 11,743,448 B2
(45) Date of Patent: Aug. 29, 2023

(54) ELECTRONIC DEVICE, SYSTEM, AND METHOD OF CONTROLLING ELECTRONIC DEVICE

(71) Applicant: CANON KABUSHIKI KAISHA, Tokyo (JP)

(72) Inventor: Masaaki Iwane, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/189,980

(22) Filed: Mar. 2, 2021

(65) Prior Publication Data
US 2021/0289195 A1 Sep. 16, 2021

(30) Foreign Application Priority Data
Mar. 10, 2020 (JP) .................. 2020-040913

(51) Int. Cl.
  H04N 17/02 (2006.01)
  H04N 17/00 (2006.01)
  H04N 25/701 (2023.01)

(52) U.S. Cl.
  CPC ......... H04N 17/002 (2013.01); H04N 25/701 (2023.01)

(58) Field of Classification Search
  CPC ............................ H04N 17/002; H04N 5/3692
  USPC .......................................... 348/187
  See application file for complete search history.

(56) References Cited

U.S. PATENT DOCUMENTS

| | | | |
|---|---|---|---|
| 8,120,396 B2 | 2/2012 | Iwane | 327/158 |
| 8,368,431 B2 | 2/2013 | Iwane | 327/99 |
| 9,888,190 B2* | 2/2018 | Yamada | H04N 5/232 |
| 9,894,303 B2* | 2/2018 | Miyake | H01L 27/14636 |
| 10,542,228 B2* | 1/2020 | Nozawa | H04N 5/374 |
| 10,992,889 B2* | 4/2021 | Kawazu | H04N 5/367 |
| 11,039,098 B2* | 6/2021 | Niwa | H04N 5/37455 |
| 11,320,588 B1* | 5/2022 | Mazed | G16H 40/67 |
| 2011/0032009 A1 | 2/2011 | Iwane | 327/142 |
| 2011/0156939 A1 | 6/2011 | Iwane | 341/101 |
| 2019/0373190 A1 | 12/2019 | Kawazu | |

FOREIGN PATENT DOCUMENTS

| | | |
|---|---|---|
| JP | 2005-252951 A | 9/2005 |
| JP | 2008-244637 A | 10/2008 |
| JP | 2012-4702 A | 1/2012 |
| JP | 2018-93326 A | 6/2018 |
| WO | 2018/100902 A1 | 6/2018 |

* cited by examiner

Primary Examiner — Trang U Tran
(74) Attorney, Agent, or Firm — Venable LLP

(57) ABSTRACT

Provided is an electronic device including a cell array unit in which cells are arranged in rows and columns, signal lines, each of the signal lines being arranged corresponding to one of the rows or columns and being connected to corresponding cells, a first electrode via which a signal according to a signal transmitted via at least one of the signal lines passes, a second electrode to which a selection signal is input to select a part of the signal lines; and a third electrode that is electrically connected to a node between cells that are connected to the part of the signal lines selected based on the selection signal and the first electrode. A voltage potential of the third electrode correlates with a voltage potential of the part of the signal lines selected based on the selection signal.

28 Claims, 14 Drawing Sheets

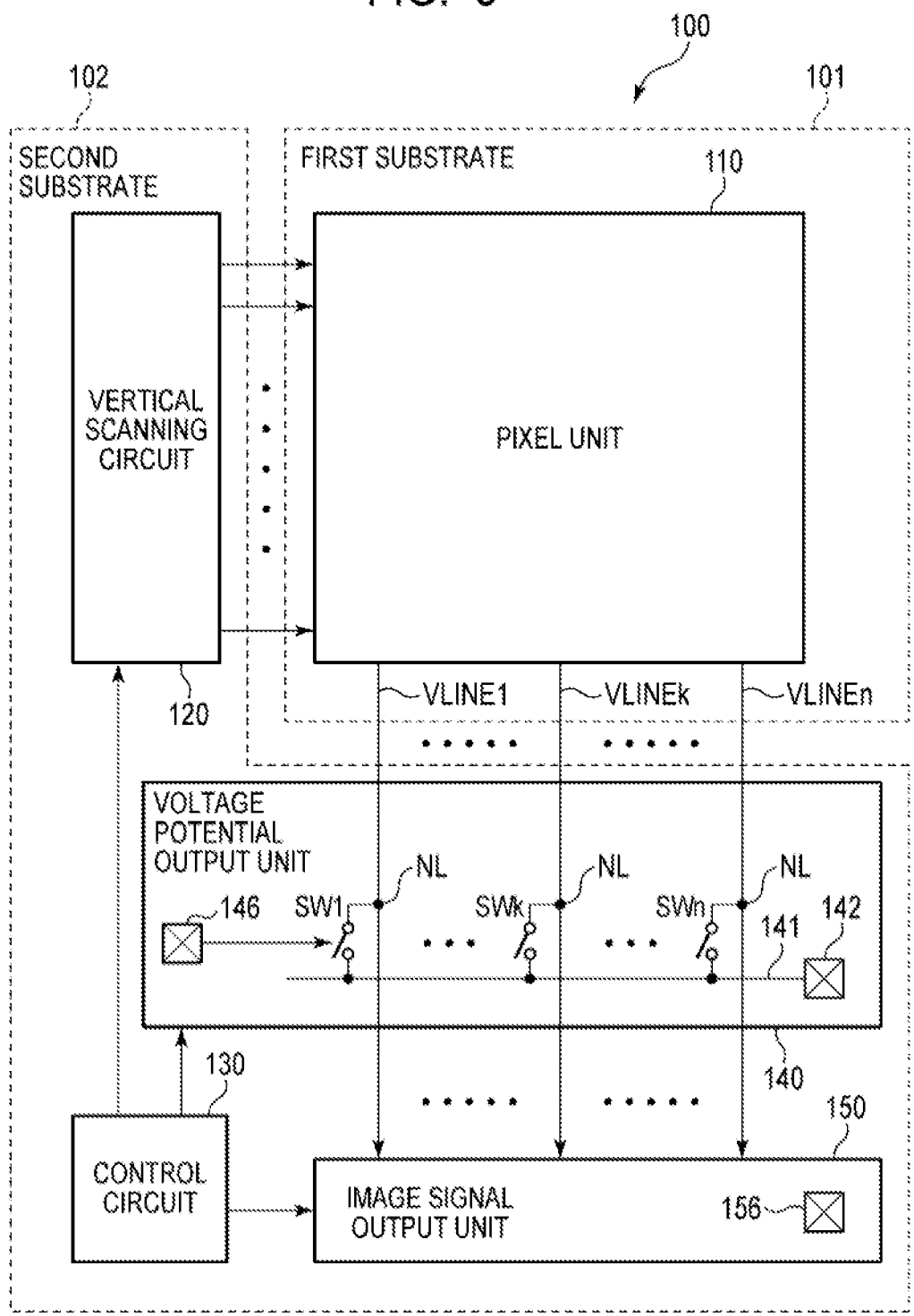

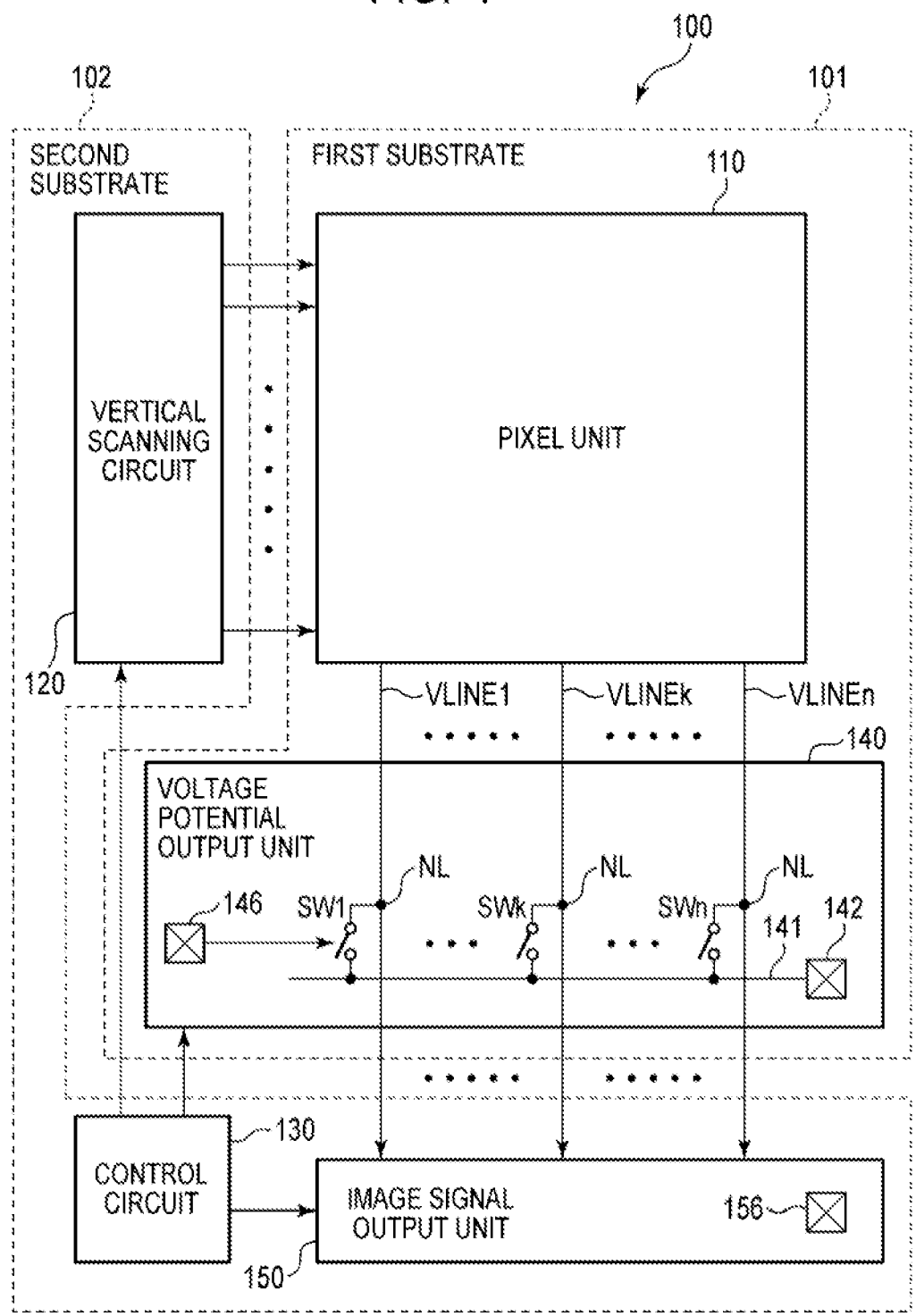

ELECTRONIC DEVICE, SYSTEM, AND METHOD OF CONTROLLING ELECTRONIC DEVICE

BACKGROUND OF THE INVENTION

Field of the Invention

The present disclosure relates to an electronic device, a system, and a method of controlling the electronic device.

Description of the Related Art

Japanese Patent Application Laid-Open No. 2005-252951 discloses solid-state imaging device in which a pixel output line between a pixel array block and a correlated double sampling (CDS) circuit is connected to an input terminal of a buffer. The buffer can output a signal corresponding to the voltage potential of the pixel output line. The output signal is used for analyzing a malfunction of the solid-state imaging device.

In the solid-state imaging device of the Japanese Patent Application Laid-Open No. 2005-252951, only a part of a plurality of pixel output lines is connected to the input terminal of the buffer. In the configuration of the solid-state imaging device of Japanese Patent Application Laid-Open No. 2005-252951, the voltage potential of the pixel output line to which the buffer is not connected is not output, and sufficient inspection may not be performed. Therefore, a method for more appropriately inputting or outputting a signal is required.

SUMMARY OF THE INVENTION

The present invention intends to provide an electronic device, system, and a method of controlling the electronic device that can more appropriately input or output a signal.

According to an aspect of the present disclosure, there is provided an electronic device including a cell array unit in which cells are arranged in a plurality of rows and a plurality of columns, a plurality of signal lines, each of the plurality of signal lines being arranged corresponding to one of the plurality of rows or the plurality of columns and being connected to corresponding cells, a first electrode via which a signal according to a signal transmitted via at least one of the plurality of signal lines passes, a second electrode to which a selection signal is input to select a part of the plurality of signal lines, and a third electrode that is electrically connected to a node between cells that are connected to the part of the plurality of signal lines selected based on the selection signal and the first electrode. A voltage potential of the third electrode correlates with a voltage potential of the part of the plurality of signal lines selected based on the selection signal.

According to another aspect of the present disclosure, there is provided an electronic device including a cell array unit in which cells are arranged in a plurality of rows and a plurality of columns, a plurality of signal lines, each of the plurality of signal lines being arranged corresponding to one of the plurality of rows or the plurality of columns and being connected to corresponding cells, a first electrode via which a digital signal according to an analog signal transmitted via at least one of the plurality of signal lines passes, a second electrode to which a selection signal is input to select a part of the plurality of signal lines, and a third electrode via which an analog signal according to an analog signal transmitted via the part of the plurality of signal lines selected based on the selection signal passes.

According to another aspect of the present disclosure, there is provided a method of controlling an electronic device including a plurality of signal lines, a first electrode, a second electrode, and a third electrode, the method including outputting a digital signal based on a voltage potential of at least one of the plurality of signal lines form the first electrode, acquiring an analog signal based on a voltage potential of a part of the plurality of signal lines from the third electrode, selecting the part of the plurality of signal lines according to the number of pulses input to the second electrode.

Further features of the present invention will become apparent from the following description of exemplary embodiments with reference to the attached drawings.

BRIEF DESCRIPTION OF THE DRAWINGS

FIG. 6 is a block diagram illustrating a schematic configuration of a photoelectric conversion device according to a fifth embodiment.

FIG. 7 is a block diagram illustrating a schematic configuration of a photoelectric conversion device according to a sixth embodiment.

DESCRIPTION OF THE EMBODIMENTS

Preferred embodiments of the present invention will now be described in detail in accordance with the accompanying drawings. The same components or corresponding components are labeled with common references throughout multiple drawings, and the description thereof may be omitted or simplified.

First Embodiment

Figure 1:
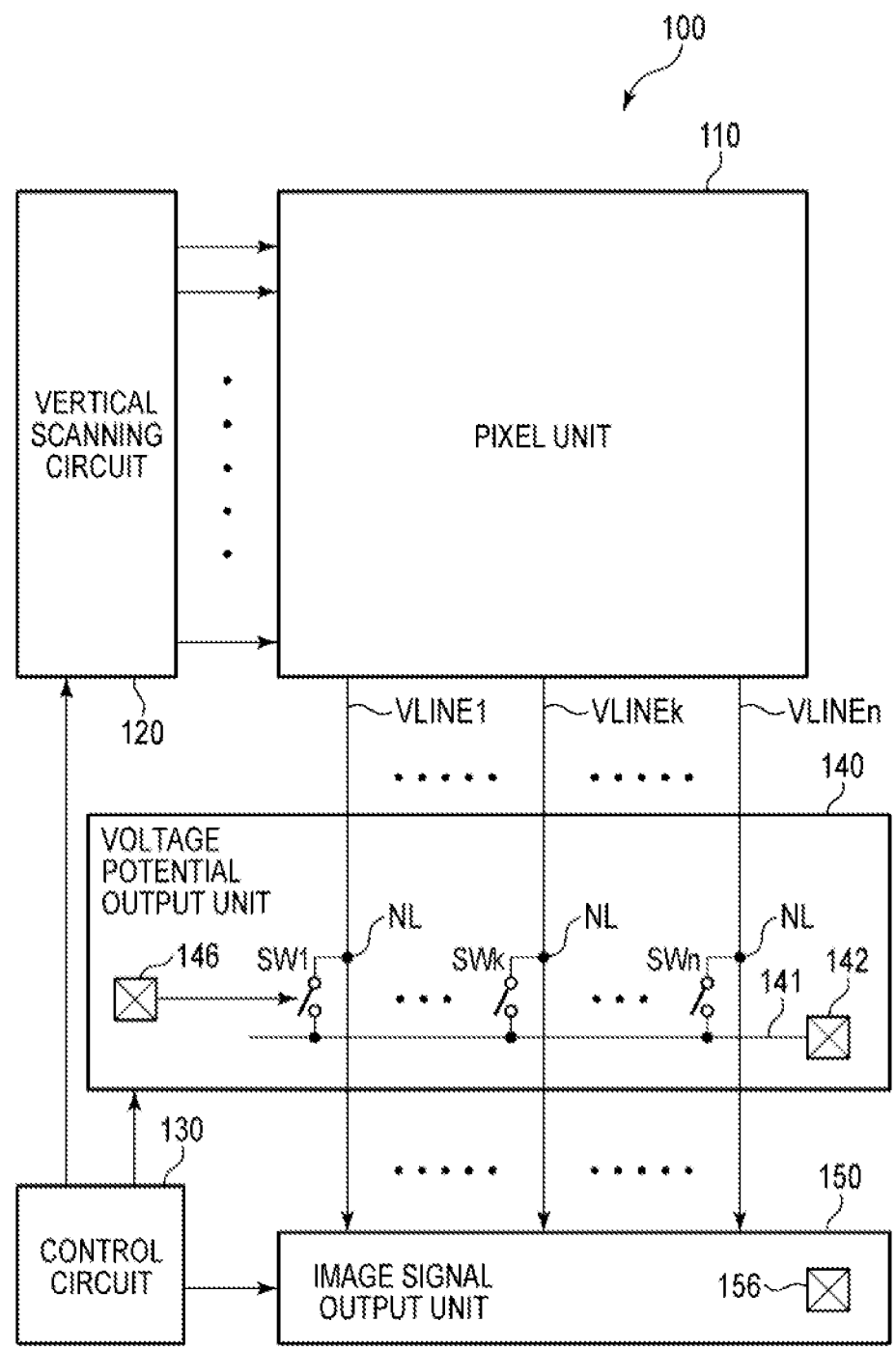
FIG. 1 is a block diagram illustrating a general configuration of a photoelectric conversion device according to a first embodiment.

FIG. 1 is a block diagram illustrating a general configuration of a photoelectric conversion device 100 according to the present embodiment. The photoelectric conversion device 100 may be, for example, an imaging device, a focus detection device, a ranging device, or the like but is not limited thereto. In the present embodiment, the photoelectric conversion device 100 is an imaging device that captures an image such as a static image, a moving image, or the like. The photoelectric conversion device 100 has a pixel unit 110, a vertical scanning circuit 120, a control circuit 130, a voltage potential output unit 140, and an image signal output unit 150. The pixel unit 110 has a plurality of pixels arranged so as to form a plurality of rows and a plurality of columns. Each of the plurality of pixels has a photoelectric conversion element that generates charges by photoelectric conversion of incident light.

The control circuit 130 controls drive timings of each component of the vertical scanning circuit 120, the voltage potential output unit 140, and the image signal output unit 150. The vertical scanning circuit 120 supplies control signals used for controlling a plurality of transistors included in the pixel of the pixel unit 110 to enter an on-state (conductive state) or an off-state (nonconductive state). The control signal is supplied to each pixel via a control line arranged corresponding to each row of the pixel unit 110. The vertical scanning circuit 120 may be formed of a logic circuit such as a shift register, an address decoder, or the like. The pixel unit 110 is provided with signal lines VLINE1, ..., VLINEk, ..., VLINEn. An index "k" or the like added to "VLINE" indicates column numbers from 1 to n, and in FIG. 1, only signal lines VLINE1, VLINEk. and VLINEn of the first column, the k-th column, and the n-th column are illustrated. In the following description, when it is not necessary to specifically identify the column in which the signal line is provided, it may be simply expressed as VLINEk. The analog signal from the pixel is read out to the VLINEk of the corresponding column.

The image signal output unit 150 is a circuit that performs processing such as correction, analog-to-digital conversion, and serialization of the signal of the signal line VLINEk. The image signal output unit 150 is a circuit for outputting an image signal according to each voltage potential of the signal line VLINEk to the outside of the photoelectric conversion device 100, and has a pad electrode 156 (first electrode) via which the image signal passes. The image signal output unit 150 may have function such as signal amplification processing, correlated double sampling processing based on signals at the time of pixel reset and signals at the time of photoelectric conversion, or the like. The image signal output from the image signal output unit 150 is typically a digital signal, but may be an analog signal if the image signal output unit 150 does not perform analog-to-digital conversion.

The voltage potential output unit 140 is a circuit having a voltage potential line 141, a pad electrode 142 (third electrode), a pad electrode 146 (second electrode), and a plurality of switches SW1, ..., SWk, ..., SWn. An index "k" or the like added to "SW" indicates column numbers from 1 to n, and in FIG. 1, only the switches SW1, SWk, and SWn in the first column, the k-th column, and the n-th column are illustrated. In the following description, when it is necessary to specifically identify the column in which the switch is provided, it may be simply expressed as SWk. The switch SWk is provided corresponding to the signal line VLINEk of each column.

The first terminal of the switch SWk is connected to a node NL of the VLINEk between the pixel unit 110 and the image signal output unit 150. The second terminal of the switch SWk is connected to the voltage potential line 141. Since the control circuit 130 controls the voltage potential output unit 140, the control circuit 130 is connected to the voltage potential output unit 140. The control circuit 130 inputs a control signal (For example, φDATA_IN described later), which is described later, to the voltage potential output unit 140. The switch SWk is controlled on or off, for example, in accordance with a control signal from the control circuit 130 and a selection signal (For example, φCK described later) input to the pad electrode 146. When the switch SWk is controlled on, the voltage potential of the voltage potential line 141 becomes the voltage potential of the signal line VLINEk of the column in which the switch SWk is turned on.

The pad electrode 142 is connected to the voltage potential line 141. The pad electrode 142 is one of the output terminals of the photoelectric conversion device 100. By bringing a probe of a voltage potential measuring device such as an oscilloscope into contact with the pad electrode 142, the voltage potential of the voltage potential line 141 is output via the pad electrode 142 to the outside of the photoelectric conversion device 100. At this time, the voltage potential of the pad electrode 142 correlates with the voltage potential of the signal line VLINEk of the selected column.

As described above, the voltage potential output unit 140 has a plurality of switches SWk serving as selection circuits for selecting at least one of the plurality of columns. Thus, the voltage potential output unit 140 outputs a voltage potential signal corresponding the voltage potential of the node NL between the pixel unit 110 and the image signal output unit 150 on the signal line VLINEk of the selected column to the outside of the photoelectric conversion device 100.

In a circuit configuration in which one of the plurality of signal lines VLINEk is directly connected to the voltage potential line 141, a signal corresponding to the voltage potential of the signal line VLINEk not connected to the voltage potential line 141 is not output. On the other hand, in the photoelectric conversion device 100 of the present embodiment, at least one of the plurality of signal lines VLINEk is selected by the selection circuit. Then, a voltage potential signal corresponding to the voltage potential of the selected signal line VLINEk is output to the outside of the photoelectric conversion device 100. In this configuration, the voltage potential signals of different columns can be output by changing the signal line VLINEk selected by the selection circuit. Therefore, according to the present embodiment, there is provided a photoelectric conversion device 100 capable of more appropriately outputting a signal for inspection.

The voltage potential signal output from the photoelectric conversion device 100 may be used, for example, for failure inspection and failure factor analysis of the photoelectric conversion device 100. The image signal output from the image signal output unit 150 is a signal after being subjected processing such as analog-to-digital conversion and correction. Therefore, when a failure inspection or the like is performed using the image signal, sufficient accuracy may not be acquired because the influence of the signal processing is superimposed on the image signal. Furthermore, the image signal may not be based on the ground voltage potential because signal processing such as correlated double sampling processing is performed. Therefore, when a failure inspection or the like is performed using the image signal, it is sometimes difficult to acquire information necessary for the failure inspection.

On the other hand, in the present embodiment, since the voltage potential is acquired from the node NL located in the preceding stage of the image signal output unit 150, the signal before the signal processing can be acquired. Furthermore, in the present embodiment, a voltage potential based on the ground earth can be acquired from the pad electrode 142. Therefore, in the present embodiment, it is possible to perform a failure inspection or the like with higher accuracy than in the case where the image signal is used.

Further, in the present embodiment, since the voltage potential signal can be acquired from more signal lines VLINEk as described above, it is possible to perform a failure inspection or the like with higher accuracy. In addition, shading can be detected by referring to voltage potential signals acquired from signal lines VLINEk in the plurality of columns, and data for shading correction can also be acquired.

Furthermore, in the present embodiment, since the voltage potential signal can be directly acquired from the signal line VLINEk independently of the acquisition of the image signal, the time change of the voltage potential of the signal line VLINEk can be measured. By analyzing the time change of the voltage potential, it is possible to estimate the failure position and the cause of the failure. Therefore, information closer to the root cause of the failure can be acquired. As a result, the cause of failure in the manufacturing process can be grasped, and the yield can be improved, that is, the internal failure cost can be reduced.

Furthermore, defects such as point flaws and line flaws may occur after the photoelectric conversion device 100 is shipped to the market. In such a case as well, by analyzing the time change of the voltage potential of the signal line VLINEk corresponding to the position where the point flaws, the line flaws, or the like occurs, it is possible to estimate the failure position, the cause of the failure, or the like. By using these results to prevent failures after shipping to the market, it is possible to reduce the external failure cost.

Note that in FIG. 1, it is assumed that the switches SWk are provided for all the signal lines VLINEk, but it is not essential. The switches SWk may be provided for some of the signal lines VLINEk, for example, the switches SWk may be provided for about half of all the signal lines VLINEk. The ratio between the number of signal lines VLINEk and the number of switches SWk may be appropriately set in consideration of, for example, the whole circuit scale.

Second Embodiment

In the present embodiment, an example of a specific configuration of each unit of the photoelectric conversion device 100 of the first embodiment is described. In the description of the present embodiment, the description may be omitted or simplified for portions common to the first embodiment.

Figure 2A:
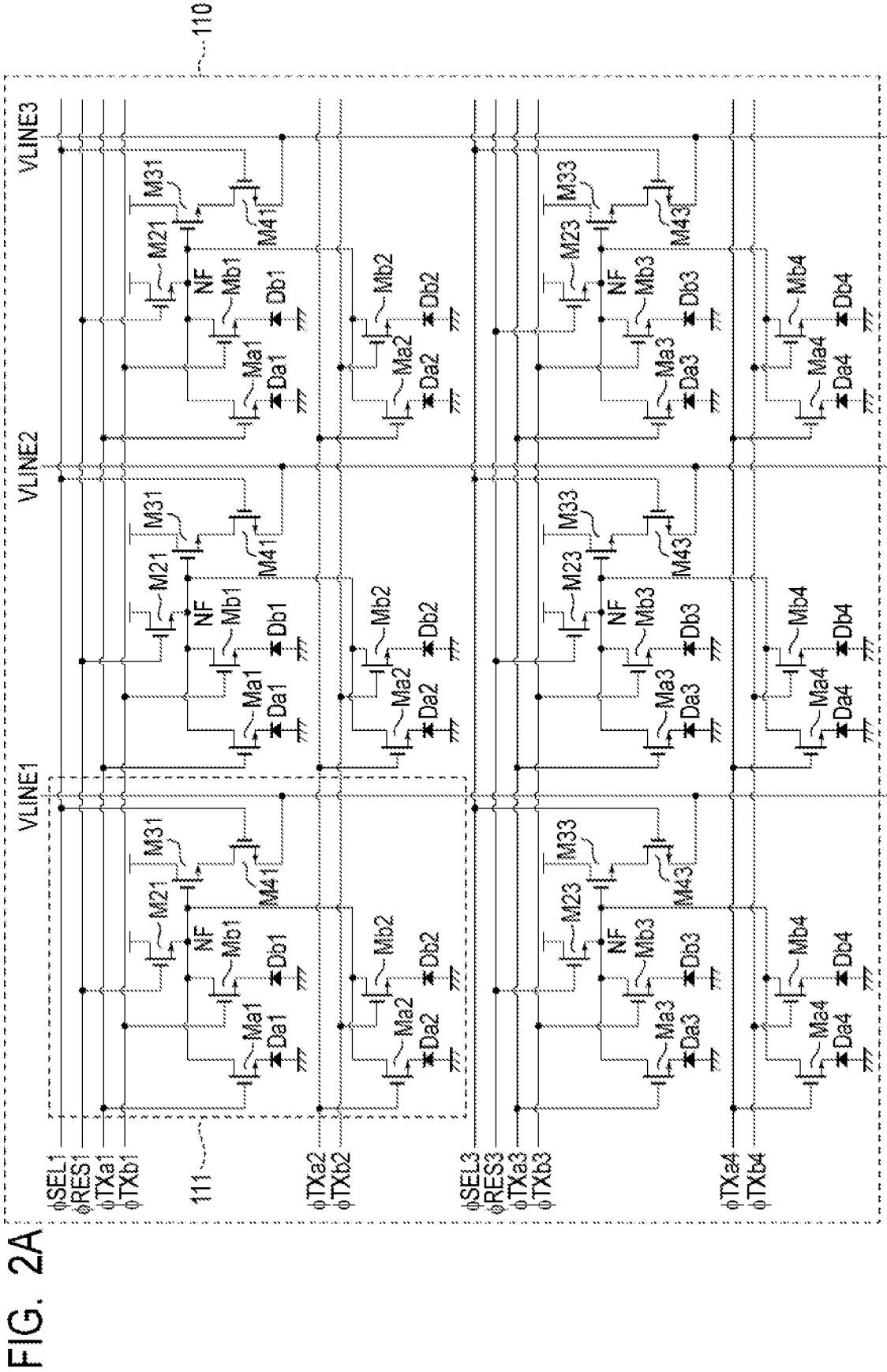
FIG. 2A and FIG. 2B are circuit diagrams of a photoelectric conversion device according to a second embodiment.
Figure 2B:
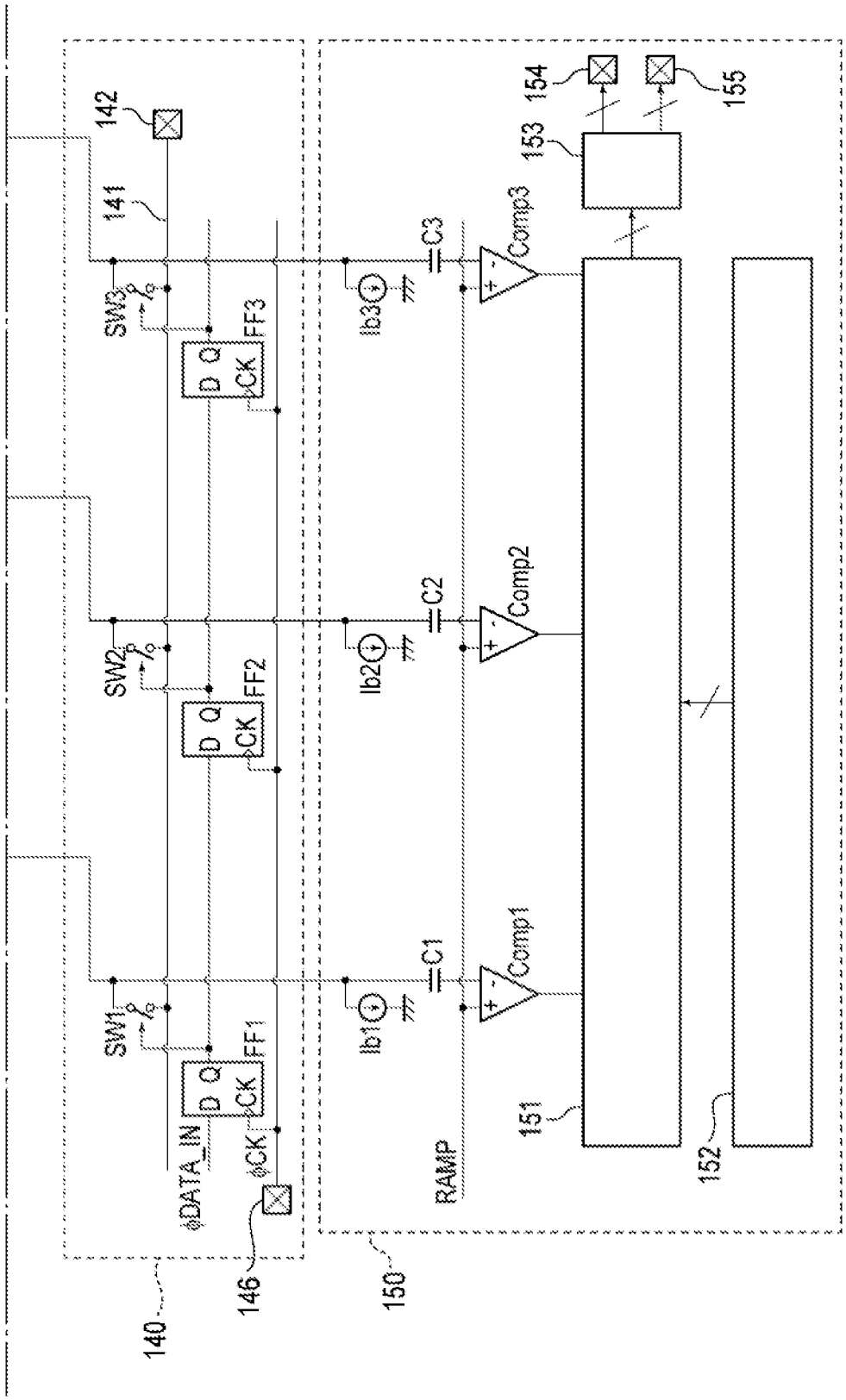

FIG. 2A and FIG. 2B are circuit diagrams of a photoelectric conversion device 100 according to the present embodiment. FIG. 2A and FIG. 2B illustrate a specific configuration example of the pixel unit 110, the voltage potential output unit 140, and the image signal output unit 150 described in the first embodiment. Since the vertical scanning circuit 120 and the control circuit 130 are the same as those of the first embodiment, they are not illustrated in FIG. 2A and FIG. 2B.

The pixel unit 110 includes a plurality of pixels 111 arranged in a plurality of rows and a plurality of columns. Although only two rows and three columns of pixels 111 are illustrated in FIG. 2A for simplicity, in practice, the pixel unit 110 may include an array of thousands of rows and thousands of columns of pixels 111. The pixel 111 in the first row and first column has photodiodes Da1, Db1, Da2, and Db2, transfer transistors Ma1, Mb1, Ma2, and Mb2, a reset transistor M21, an output transistor M31, and a selection transistor M41. The other pixels 111 have substantially the same configuration except for the difference in reference numerals. Accordingly, description will be made mainly of the pixels 111 in the first row and first column, and description will be omitted for the other pixels 111.

The photodiodes Da1, Db1, Da2, and Db2 are photoelectric conversion elements that generate charges by photoelectric conversion of incident light. Anodes of photodiodes Da1, Db1, Da2, and Db2 are connected to a ground node. Cathodes of the photodiodes Da1, Db1, Da2 and Db2 are connected to the sources of the transfer transistors Ma1, Mb1, Ma2, and Mb2, respectively. The drains of the transfer transistors Ma1, Mb1, Ma2, and Mb2 are connected to the source of the reset transistor M21 and the gate of the output transistor M31. The node NF to which the drains of the transfer transistors Ma1, Mb1, Ma2, and Mb2, the source of the reset transistor M21, and the gate of the output transistor M31 are connected is so-called floating diffusion. The node NF has a capacitance component, functions as a charge holding portion and constitutes a charge-voltage conversion unit having the capacitance component.

The drain of the reset transistor M21 and the drain of the output transistor M31 are connected to a power supply node. The source of the output transistor M31 is connected to the drain of the selection transistor M41. The source of the selection transistor M41 is connected to the signal line VLINE1. Note that the names of the source and drain of the transistor may be different in accordance with the conductivity type of the transistor, the function of interest, or the like, and may be called by a name opposite to the names of the source and drain described above.

The vertical scanning circuit 120 supplies a control signal φSEL1 to the gate of the selection transistor M41, and supplies a control signal φRES1 to the gate of the reset transistor M21. The vertical scanning circuit 120 also supplies control signals φTXa1, φTXb1, φTXa2, and φTXb2 to the gates of the transfer transistor Ma1, Mb1, Ma2, and Mb2, respectively.

When each transistor of the pixel 111 is configured of an N-channel transistor, the corresponding transistor is turned on when a high level control signal is supplied from the vertical scanning circuit 120. When a low level control signal is supplied from the vertical scanning circuit 120, the corresponding transistor is turned off. Each transistor of the pixel 111 may be configured of a P-channel transistor. When each transistor of the pixel 111 is configured of a P-channel transistor, the signal level of the control signal for driving each transistor is opposite to that of the N-channel transistor.

When an optical image of an object is incident on the pixel unit 110, the photodiodes Da1, Db1, Da2, and Db2 of each pixel 111 convert the incident light into charges corresponding to the quantity of light (photoelectric conversion) and accumulate the generated charges. The transfer transistors Ma1, Mb1, Ma2, and Mb2 are turned to on to transfer the charges accumulated in the photodiodes Da1, Db1, Da2, and Db2 to the node NF.

The node NF holds the charges transferred from the photodiodes Da1, Db1, Da2, and Db2, and has a voltage potential corresponding to the amount of the transferred charges by the charge-voltage conversion by the capacitance component thereof. The output transistor M31 has a configuration in which a power supply voltage potential is applied to the drain thereof and a bias current is supplied to the source thereof via the selection transistor M41 from a current source in the image signal output unit 150, thereby constituting an amplifying unit (source follower circuit) having a gate as an input node. Thus, the output transistor M31 outputs the pixel signal based on the voltage potential of the node NF via the selection transistor M41 to the signal line VLINE1. The reset transistor M21 is turned on to reset the node NF to a voltage potential corresponding to the power supply voltage potential.

The voltage potential output unit 140 has a voltage potential line 141, a pad electrode 142, a pad electrode 146, and a plurality of switches SW1, SW2, and SW3 as in the first embodiment. Further, the voltage potential output unit 140 of the present embodiment has flip-flops FF1, FF2, and FF3 arranged corresponding to the plurality of switches SW1, SW2, and SW3, respectively. Each of the switches SW1, SW2, and SW3 has a control terminal and is turned on when the voltage potential input to the control terminal is at a high level, and are turned off when the voltage potential input to the control terminal is at a low level.

Each of the flip-flops FF1, FF2, and FF3 has an input terminal D, an output terminal Q, and a clock terminal CK. A control signal φDATA_IN is input to the input terminal D of the flip-flop FF1 from the control circuit 130. The output terminal Q of the flip-flop FF1 is connected to the control terminal of the switch SW1 and the input terminal D of the flip-flop FF2. The output terminal Q of the flip-flop FF2 is connected to the control terminal of the switch SW2 and the input terminal D of the flip-flop FF3. Similarly, in the flip-flops of the subsequent columns, the output terminal Q of one column is connected to the control terminal of the switch of the same column and the input terminal D of the next column. A selection signal φCK is input to the clock terminals CK of the flip-flops FF1, FF2, and FF3 via the pad electrode 146. In this example, the input of the selection signal φCK is an input from the outside of the photoelectric conversion device 100, but the input of the selection signal φCK may be an input from a circuit inside the photoelectric conversion device 100, for example the control circuit 130. The electrode to which the selection signal φCK is input may not be the pad electrode 146 exposed to the outside of the photoelectric conversion device 100, but may be an electrode not exposed to the outside of the photoelectric conversion device 100.

The image signal output unit 150 has current sources Ib1, Ib2, and Ib3, capacitive elements C1, C2 and C3, and comparators Comp1, Comp2, and Comp3. The current source Ib1, the capacitive element C1, and the comparator Comp1 are arranged corresponding to the signal line VLINE1. The current source Ib2, the capacitive element C2, and the comparator Comp2 are arranged corresponding to the signal line VLINE2. The current source Ib3, the capacitive element C3, and the comparator Comp3 are arranged corresponding to the signal line VLINE3. The image signal output unit 150 further has a digital line memory 151, a horizontal scanning circuit 152, a serializer 153, and pad electrodes 154 and 155. The pad electrodes 154 and 155 (first electrode) correspond to the pad electrode 156 in the first embodiment.

The current source Ib1 is connected to the signal line VLINE1. The current source Ib1 supplies a current via the signal line VLINE1 and the selection transistor M41 to the output transistor M31.

The first terminal of the capacitive element C1 is connected to the signal line VLINE1, and the second terminal of the capacitive element C1 is connected to the inverting input terminal of the comparator Comp1. A reference signal RAMP from the control circuit 130 is input to the non-inverting input terminal of the comparator Comp1. The output terminal of the comparator Comp1 is connected to the digital line memory 151.

The reference signal RAMP is, for example, a signal in which the voltage potential changes in a linear or stepwise manner according to time. The comparator Comp1 compares the voltage potential of the reference signal RAMP input to the non-inverting input terminal with the voltage potential of the signal line VLINE1 input to the inverting input terminal via the capacitive element C1. A signal indicating the comparison result is output from the output terminal of the comparator Comp1 to the digital line memory 151. When the level of the output signal of the comparator Comp1 is inverted, a count value indicating the time is stored in the digital line memory 151 as a digital value indicating the voltage potential of the signal line VLINE1. In this manner, the comparator Comp1 and the digital line memory 151 function as an analog-to-digital conversion circuit for converting the voltage potential of the signal line VLINE1 into a digital signal.

Since the signal lines VLINE2 and VLINE3, the current sources Ib2 and Ib3, the capacitive elements C2 and C3, and the comparators Comp2 and Comp3 are connected in the same manner as described above, the description thereof will be omitted. The digital line memory 151 stores a digital signal indicating the voltage potential of a signal line for each column.

Based on the timing signal from the control circuit 130, the horizontal scanning circuit 152 outputs a control signal to the digital line memory 151 for outputting the digital signal stored in the digital line memory 151 to the serializer 153. The serializer 153 serializes a signal input from the digital line memory 151 and outputs the serialized signal via the pad electrodes 154 and 155 to the outside of the photoelectric conversion device 100. Note that the signals output from the pad electrodes 154 and 155 to the outside of the photoelectric conversion device 100 may be digital signals based on a differential transmission system such as low voltage differential signaling (LVDS).

Figure 3A:
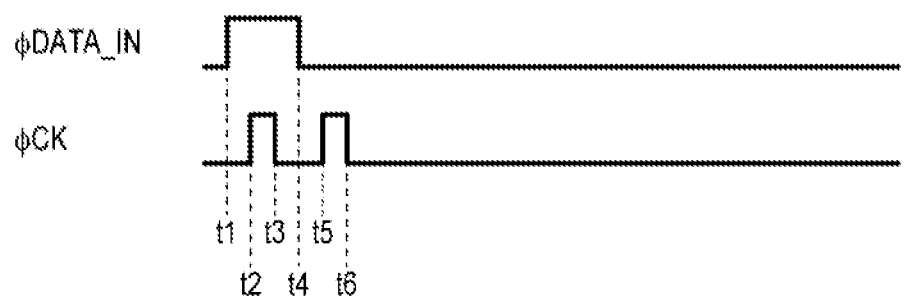
FIG. 3A and FIG. 3B are timing charts illustrating an operation of a voltage potential output unit according to the second embodiment.
Figure 3B:
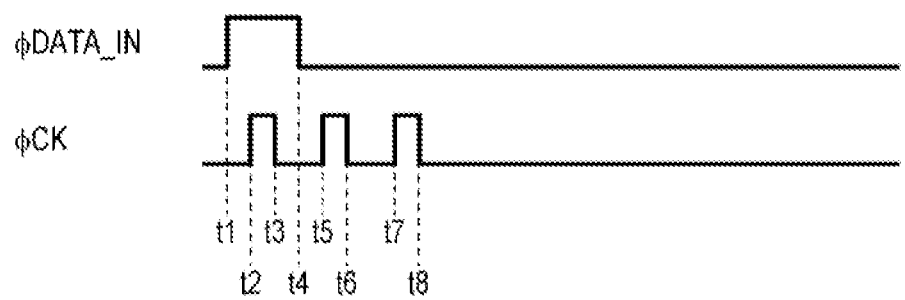

FIG. 3A and FIG. 3B are timing charts illustrating the operation of the voltage potential output unit 140 according to the present embodiment. The operation of the flip-flops FF1, FF2 and FF3 will be described with reference to FIG. 3A and FIG. 3B. FIG. 3A is a timing chart in a case where the voltage potential of the signal line VLINE2 is output, and FIG. 3B is a timing chart in a case where the voltage potential of the signal line VLINE3 is output.

With reference to FIG. 3A, the operation of the voltage potential output unit 140 in the case where the voltage potential of the signal line VLINE2 is output is described. In the initial state, the voltage potentials stored in the flip-flops FF1, FF2, and FF3 are assumed to be low.

At time t1, the control signal φDATA_IN becomes a high level. Thus, the high level voltage potential is input to the input terminal D of the flip-flop FF1.

At time t2, the selection signal φCK becomes a high level, and at time t3, the selection signal φCK becomes a low level. That is, during the period from time t2 to time t3, one pulse is input to the clock terminal CK of the flip-flop FF1. Thus, the high level voltage potential input to the input terminal D of the flip-flop FF1 is stored in the flip-flop FFL. Then, the voltage potential output from the output terminal Q of the flip-flop FF1 becomes a high level.

At time t4, the control signal φDATA_IN becomes a low level. Thus, the low level voltage potential is input to the input terminal D of the flip-flop FF1.

At time t5, the selection signal φCK becomes a high level and at time t6, the selection signal φCK becomes a low level. That is, during the period from time t5 to time t6, one pulse is input to the clock terminal CK of the flip-flop FF2. Thus, the high level voltage potential input to the input terminal D of the flip-flop FF2 is stored in the flip-flop FF2. Then, the voltage potential output from the output terminal Q of the flip-flop FF2 becomes a high level.

At the same time, one pulse is also input to the clock terminal CK of the flip-flop FF1. Thus, the low level voltage potential input to the input terminal D of the flip-flop FF1 is stored in the flip-flop FF1. Then, the voltage potential output from the output terminal Q of the flip-flop FF1 becomes a low level.

That is, immediately after the time t6, the voltage potential stored in the flip-flops FF1 and FF3 are at the low level and the voltage potential stored in the flip-flop FF2 is at the high level. Thus, the switch SW2 is turned on, and the switches SW1 and SW3 are turned off. Therefore, the voltage potential of the voltage potential line 141 becomes the voltage potential of the signal line VLINE2. By bringing a probe of a voltage potential measuring device such as an oscilloscope into contact with the pad electrode 142, a voltage potential corresponding to the voltage potential of the signal line VLINE2 is output to the outside of the photoelectric conversion device 100.

In this operation, the cascaded flip-flops FF1, FF2, and FF3 operate as a shift register. That is, each time the pulse of the selection signal φCK is input, a flip-flop storing the high level voltage potential shifts. Therefore, assuming that the number of pulses of the selection signal φCK is p, the output of the p-th flip-flop becomes a high level, and the voltage potential of the signal line VLINEp of the p-th column is output to the outside of the photoelectric conversion device 100. As described above, the voltage potential output unit 140 of the present embodiment can change a signal line that outputs the voltage potential according to the number of pulses included in the selection signal φCK.

FIG. 3B illustrates an example in which the number of the pulses of the selection signal φCK is changed to three. In this example, since the number of pulses is three, the voltage potential corresponding to the voltage potential of the signal line VLINE3 is output to the outside of the photoelectric conversion device 100. Similarly, by changing the number of pulses of the selection signal φCK, the first column can be selected and the fourth and subsequent columns can be selected.

Note that the number of pulses of the selection signal φCK within a period in which the control signal φDATA_IN is at the high level may be plural. When the number of the pulses of the selection signal φCK during a period in which the control signal φDATA_IN is at the high level is q, the signal lines for q columns are simultaneously selected.

In the present embodiment, a specific configuration example of the photoelectric conversion device 100 of the first embodiment has been described. Therefore, according to the present embodiment, there is provided a photoelectric conversion device 100 which can acquire the same effect as that described in the first embodiment. The voltage potential output unit 140 of the present embodiment includes a shift register composed of flip-flops FF1, FF2, and FF3 and a selection circuit including switches SW1, SW2, and SW3. Thus, the photoelectric conversion device 100 of the present embodiment can select any signal line VLINEk in accordance with the number of pulses of the selection signal φCK supplied from the outside and can output the voltage potential of the selected signal line VLINEk.

In the present embodiment, the voltage potential output unit 140 includes a sequential circuit composed of flip-flops FF1, FF2, and FF3. Thus, the selection circuit can be realized in a small circuit scale. Specifically, the area occupied by the voltage potential output unit 140 using this sequential circuit can be made smaller than the area occupied by the image signal output unit 150. Therefore, an increase in the occupied area due to the provision of the voltage potential output unit 140 is not a serious problem. However, the voltage potential output unit 140 may include an address decoder in a case where the influence of an increase in the circuit scale is acceptable, such as in a case where the number of signal lines VLINEk is small.

Third Embodiment

In the present embodiment, another example of a specific configuration of each unit of the photoelectric conversion device 100 of the first embodiment is described. In the description of the present embodiment, the description may be omitted or simplified for portions common to the first embodiment or the second embodiment.

Figure 4A:
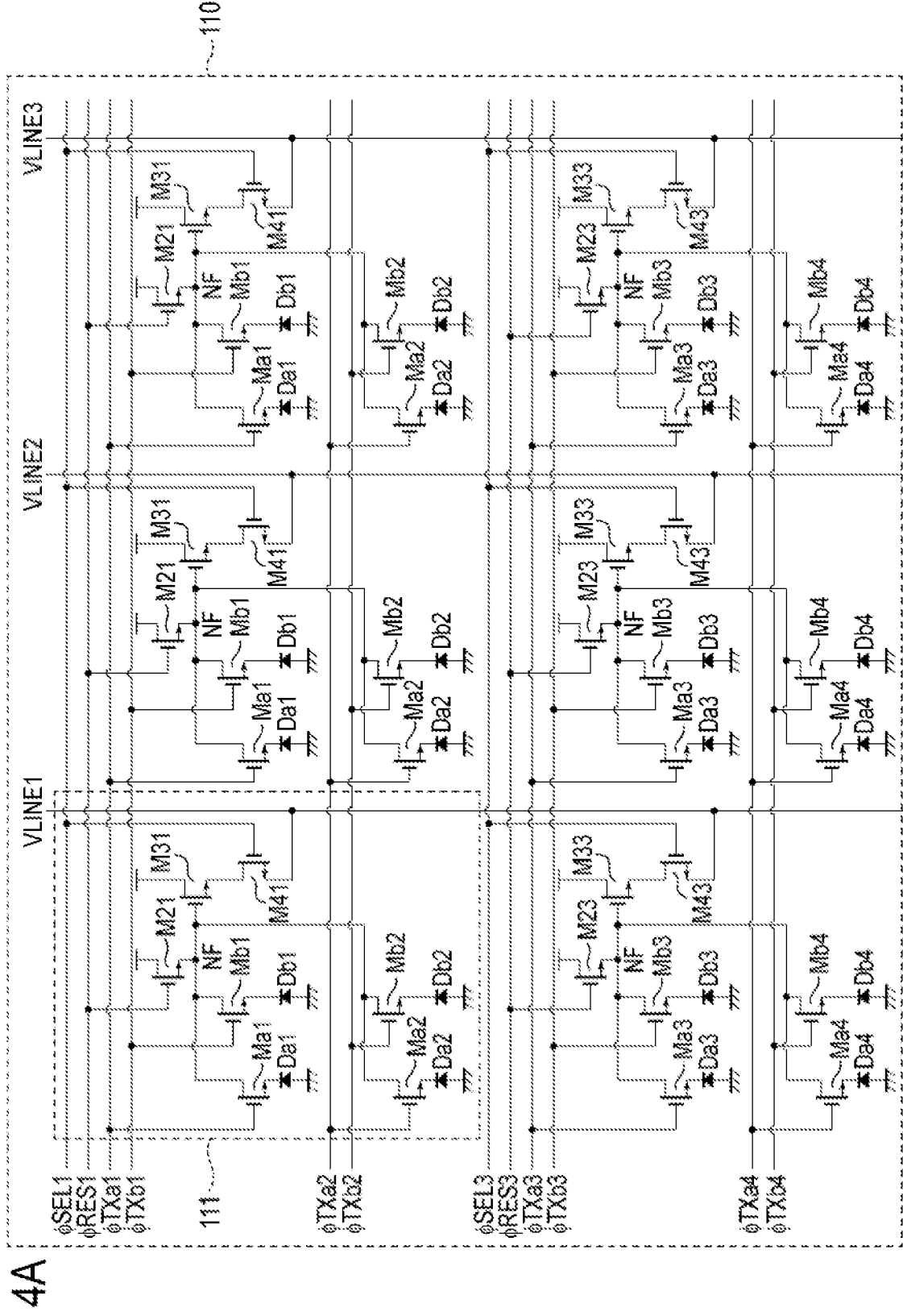
FIG. 4A and FIG. 4B are circuit diagrams of a photoelectric conversion device according to a third embodiment.
Figure 4B:
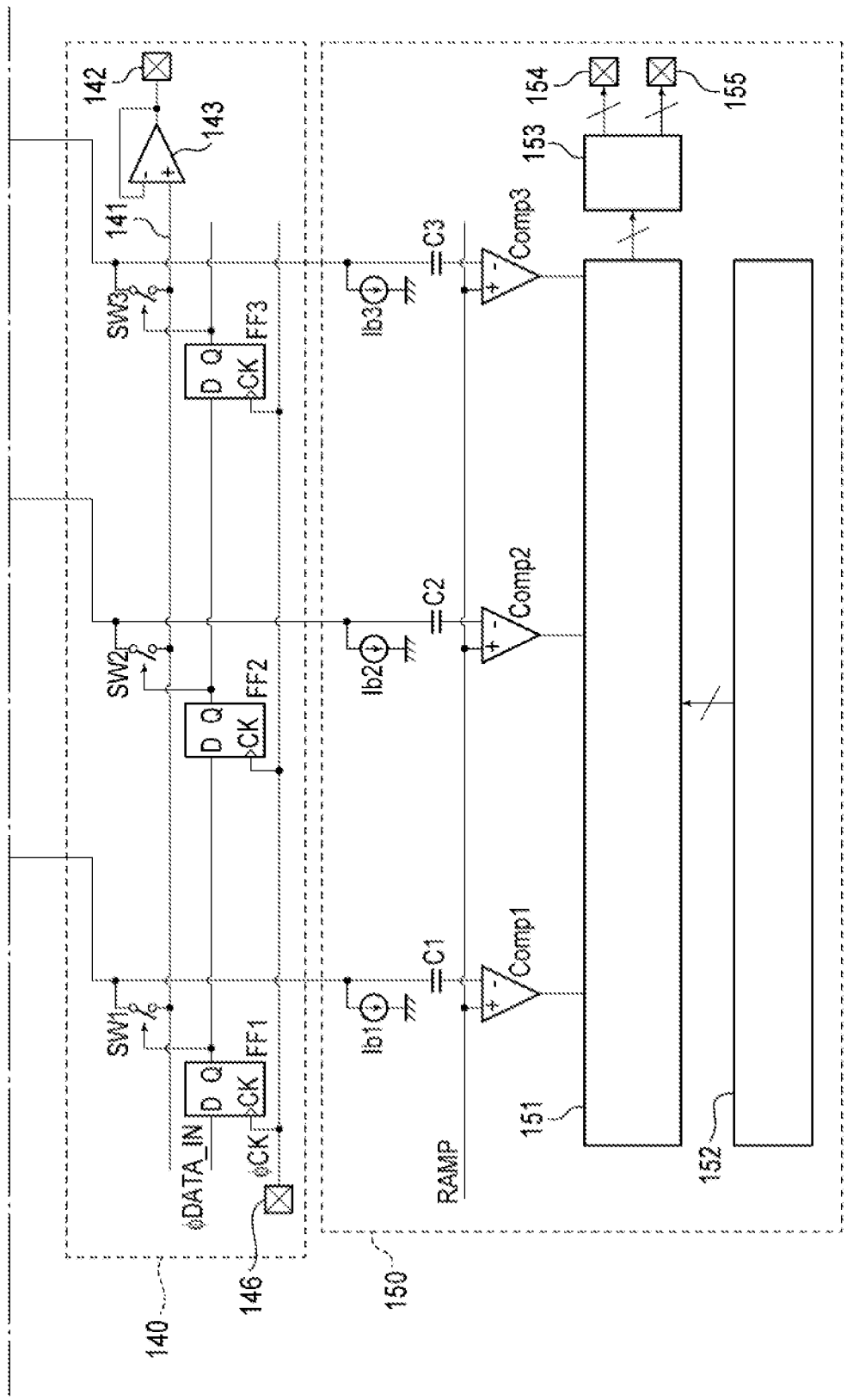

FIG. 4A and FIG. 4B are circuit diagrams of the photoelectric conversion device 100 according to the present embodiment. FIG. 4A and FIG. 4B illustrate a specific configuration example of the pixel unit 110, the voltage potential output unit 140, and the image signal output unit 150 described in the first embodiment. Since the vertical scanning circuit 120 and the control circuit 130 are the same as those of the first embodiment, they are not illustrated in FIG. 4A and FIG. 4B. The configurations of the pixel unit 110 and the image signal output unit 150 are the same as those of the second embodiment, and therefore the descriptions thereof are omitted.

The voltage potential output unit 140 of the present embodiment further has a differential amplifier 143. The non-inverting input terminal of the differential amplifier 143 is connected to the voltage potential line 141. The inverting input terminal and the output terminal of the differential amplifier 143 are connected to the pad electrode 142. Since the inverting input terminal and the output terminal of the differential amplifier 143 are connected, the differential amplifier 143 operates as a voltage follower. That is, in the voltage potential output unit 140 of the present embodiment, a buffer circuit is provided between the voltage potential line 141 and the pad electrode 142 that is an external terminal.

In the present embodiment, the voltage potential output unit 140 is provided with a voltage follower composed of the differential amplifier 143, and the voltage potential of the voltage potential line 141 is transmitted to the pad electrode 142 via the voltage follower. The voltage follower functions as a buffer circuit for current amplification and isolation between input and output and can reduce the effect of the load of the voltage potential measuring device, so that the voltage potential can be measured more accurately.

Fourth Embodiment

In the present embodiment, another example of a specific configuration of each unit of the photoelectric conversion device 100 of the first embodiment is described. In the description of the present embodiment, the description may be omitted or simplified for portions common to the first to third embodiments.

Figure 5A:
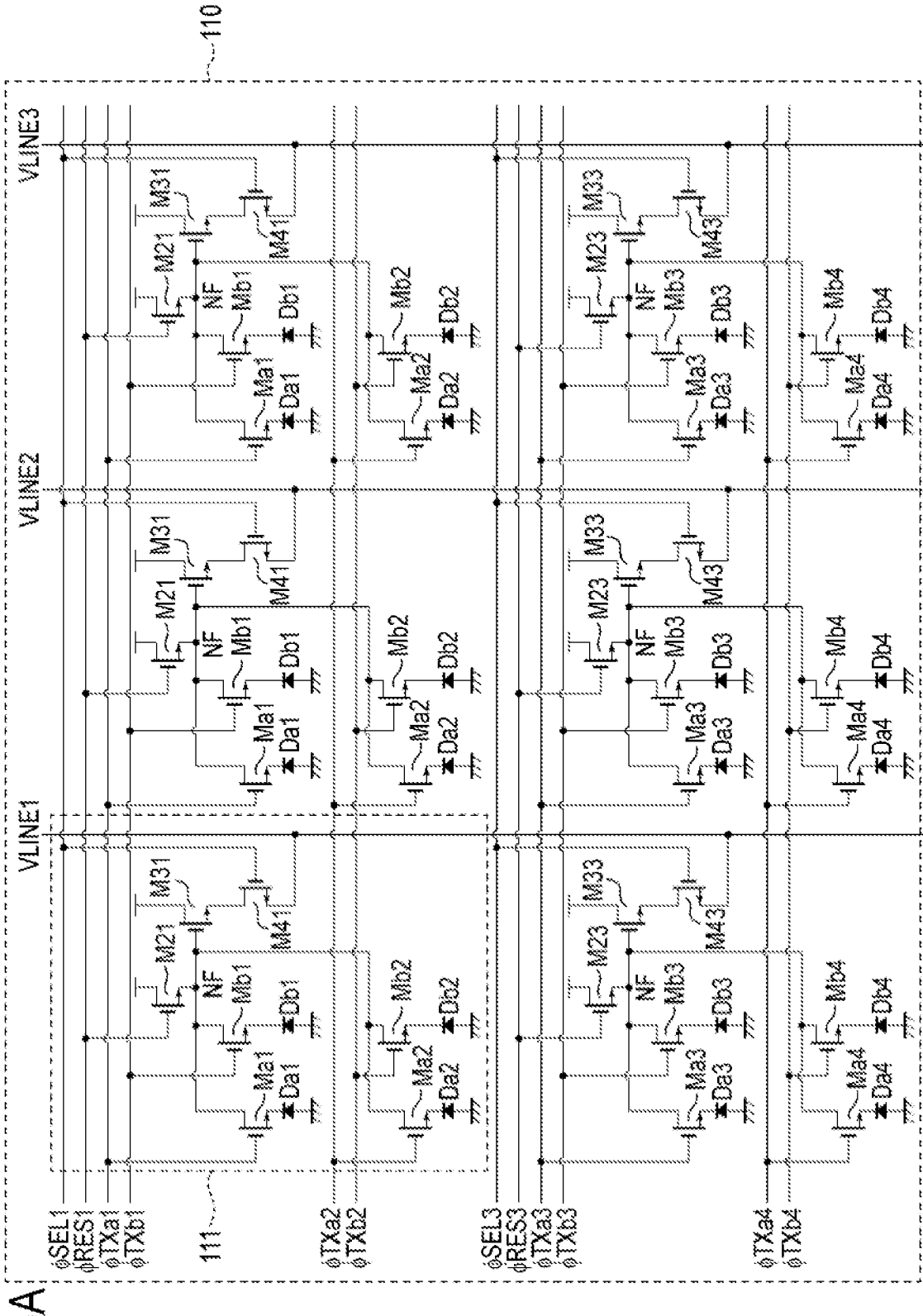
FIG. 5A and FIG. 5B are circuit diagrams of a photoelectric conversion device according to a fourth embodiment.
Figure 5B:
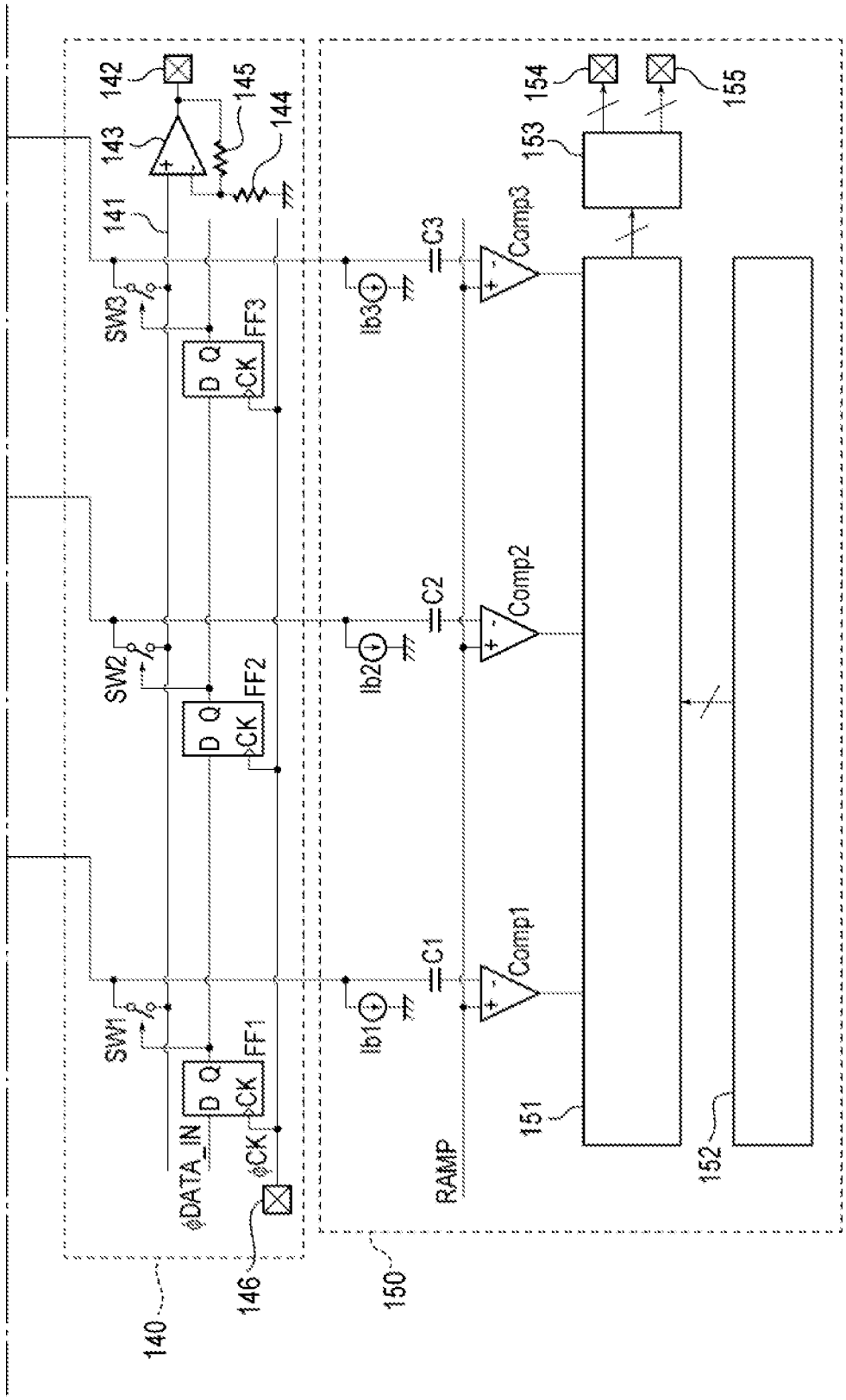

FIG. 5A and FIG. 5B are circuit diagrams of the photoelectric conversion device 100 according to the present embodiment. FIG. 5A and FIG. 5B illustrate a specific configuration example of the pixel unit 110, the voltage potential output unit 140, and the image signal output unit 150 described in the first embodiment. Since, the vertical scanning circuit 120 and the control circuit 130 are the same as those of the first embodiment, they are not illustrated in FIG. 5A and FIG. 5B. The configurations of the pixel unit 110 and the image signal output unit 150 are the same as those of the second embodiment, and therefore the descriptions thereof are omitted.

The voltage potential output unit 140 of the present embodiment further has a differential amplifier 143 and resistive elements 144 and 145. The non-inverting input terminal of the differential amplifier 143 is connected to the voltage potential line 141. The first terminal of the resistive element 144 is connected to the inverting input terminal of the differential amplifier 143, and the second terminal of the resistive element 144 is connected to the ground node. The first terminal of the resistive element 145 is connected to the inverting input terminal of the differential amplifier 143 and the first terminal of the resistive element 144. The second terminal of the resistive element 145 is connected to the output terminal of the differential amplifier 143 and the pad electrode 142. With this circuit configuration, the differential amplifier 143 and the resistive elements 144 and 145 operate as an amplifier circuit for amplifying the voltage potential.

The present embodiment further has a function of amplifying the voltage potential in addition to the same function as that described in the third embodiment. Thus, a more minute change in the voltage potential of the voltage potential line 141 can be measured.

Fifth Embodiment

In the present embodiment, a modification of the photoelectric conversion device 100 is illustrated. In the description of the present embodiment, the description may be omitted or simplified for portions common to the first to fourth embodiments.

FIG. 6 is a block diagram illustrating a schematic configuration of the photoelectric conversion device 100 according to the present embodiment. The photoelectric conversion device 100 of the present embodiment has a first substrate 101 (first component) and a second substrate 102 (second component) which are laminated each other. On the first substrate 101, the pixel unit 110 is arranged. On the second substrate 102, the vertical scanning circuit 120, the control circuit 130, the voltage potential output unit 140 and the image signal output unit 150 are arranged. That is, the circuit between the node NL and the pad electrode 142 (second circuit) is disposed on the second substrate, and the circuit between node NL and the pad electrode 156 (first circuit) is also disposed on the second substrate. The photoelectric conversion device 100 of the present embodiment is manufactured by laminating the first substrate 101 in which the pixel unit 110 is formed, and the second substrate 102 in which the vertical scanning circuit 120, the control circuit 130, the voltage potential output unit 140, and the image signal output unit 150 are formed.

According to the present embodiment, the ratio of the light receiving region can be increased by separating the substrate on which the pixel unit 110 is formed from the substrate on which the other circuit is formed. Thus, the detection sensitivity of the incident light is improved.

Sixth Embodiment

In the present embodiment, a modification of the photoelectric conversion device 100 is illustrated. In the description of the present embodiment, the description may be omitted or simplified for portions common to the first to fifth embodiments.

FIG. 7 is a block diagram illustrating a schematic configuration of the photoelectric conversion device 100 according to the present embodiment. The difference from the fifth embodiment in the present embodiment is that the voltage potential output unit 140 is formed not on the second substrate 102 but on the first substrate 101.

In the present embodiment, the first substrate 101 is provided with both the pixel unit 110 and the voltage potential output unit 140. Thus, since the first substrate 101 alone can output the voltage potential, which is output from the pixel unit 110, from the voltage potential output unit 140, the defect of the pixel unit 110 in the first substrate 101 can be inspected before the first substrate 101 and the second substrate 102 are laminated. Therefore, as compared with the configuration of the fifth embodiment in which the inspection of the pixel unit 110 cannot be performed before laminating, the inspection can be performed at an early stage to determine whether the pixel unit 110 is good or not, so that the internal failure cost can be further reduced.

Seventh Embodiment

In the present embodiment, another example of a specific configuration of each unit of the photoelectric conversion device 100 of the seventh embodiment is described. In the description of the present embodiment, the description may be omitted or simplified for portions common to the first to sixth embodiments.

Figure 8:
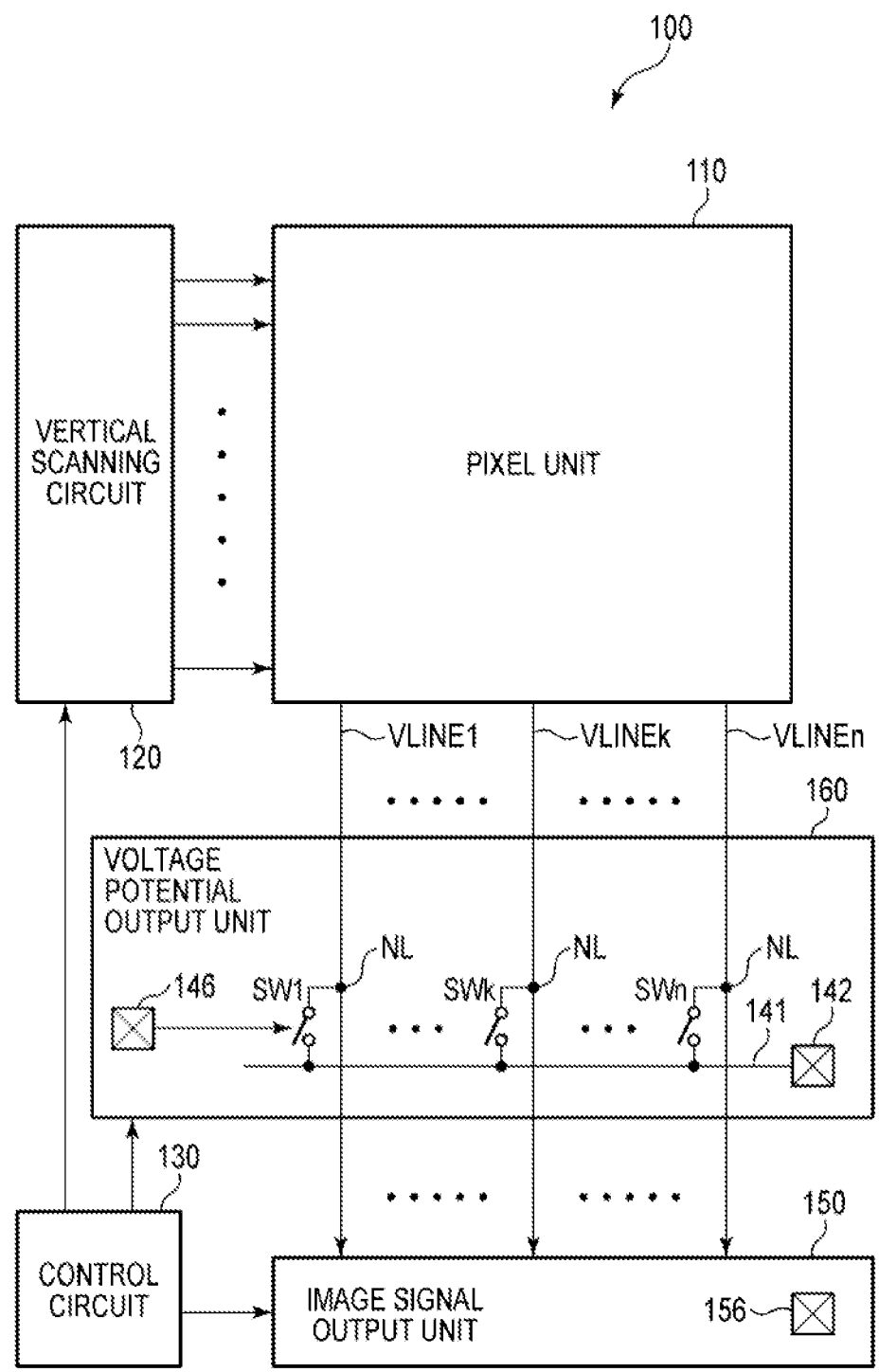
FIG. 8 is a block diagram illustrating a schematic configuration of a photoelectric conversion device according to a seventh embodiment.

FIG. 8 is a block diagram illustrating a schematic configuration of the photoelectric conversion device 100 according to the present embodiment. The difference to the first embodiment is that the voltage potential output unit 140 is replaced by the voltage potential input unit 160. The pad electrode 142 of the voltage potential output unit 140 of the first embodiment has a function of outputting a voltage potential to an external voltage potential measuring device. On the other hand, the pad electrode 142 of the voltage potential input unit 160 of the present embodiment has a function of receiving a voltage potential of an external voltage potential supply device. Since the difference in function is due to the difference in the types of external devices connected to the pad electrode 142, the circuit configuration of the photoelectric conversion device 100 itself is the same as that of the first embodiment.

In the present embodiment, the specific circuit configuration of each unit of the photoelectric conversion device 100 is substantially the same as that in FIG. 2A and FIG. 2B, and the description thereof is omitted. The difference between the present embodiment and the second embodiment is the number of control signals input to the voltage potential input unit 160 and the number of the signal lines VLINEk (That is, the number of columns of the pixel unit 110). In the present embodiment the number of columns of the pixel unit 110 is 12 and the number of signal lines VLINEk is 12.

Figure 9:
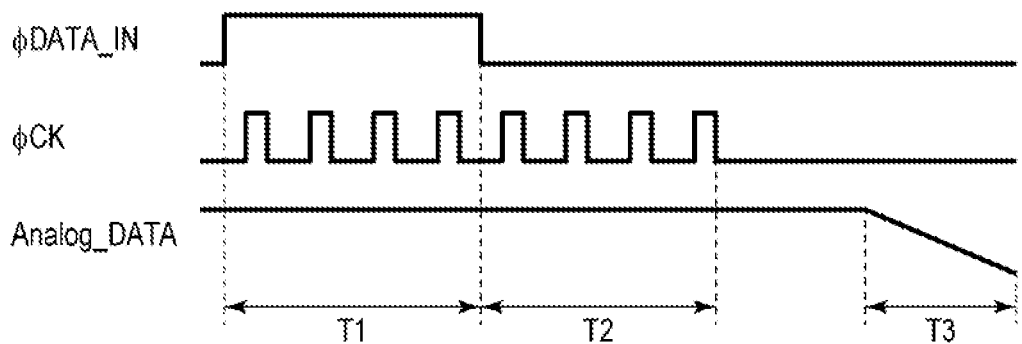
FIG. 9 is a timing chart illustrating an operation of a voltage potential output unit according to the seventh embodiment.

FIG. 9 is a timing chart illustrating the operation of the voltage potential input unit 160 according to the present embodiment. The meanings of the control signal φDATA_IN and the selection signal φCK illustrated in FIG. 9 are the same as those in FIG. 3A and FIG. 3B. The input signal Analog_DATA illustrated in FIG. 9 indicates a voltage potential from an external voltage potential supply device to the pad electrode 142.

In the period T1, the control signal φDATA_IN is at a high level. In this period, four pulses of the selection signal φCK are input. Thus, the output of each of the flip-flops in the first to fourth columns is at a high level.

In the period T2, the control signal φDATA_IN is at a low level. In this period four pulses of the selection signal φCK are input. Thus, the voltage potential level stored in each of the flip-flops in the first to fourth columns is shifted by four columns, and the output of each of the flip-flops in the fifth to eighth columns is at a high level. In this way, the signal lines VLINEk in the fifth to eighth columns are selected by the operation of the periods T1 and T2 and connected to the voltage potential line 141 via the switches SWk. That is, out of the twelve signal lines VLINEk, four signal lines at the center are connected via the switches SWk and the voltage potential lines 141 to the pad electrode 142.

In the period T3, the voltage potential of the input signal Analog_DATA gradually decrease in accordance with time. At this time, the voltage potential of each of the signal lines VLINEk in the fifth to eighth columns connected to the pad electrode 142 also decreases in accordance with the change in the voltage potential of the input signal Analog_DATA. During this period, the image signal output unit 150 outputs an image signal corresponding to the voltage potential of the signal line VLINEk of each column to the outside of the photoelectric conversion device 100.

In the period T3 of this processing, the image signal is output in a state in which a voltage potential lower than that of the other signal lines VLINEk is applied to the signal lines VLINEk in the fifth to eighth columns. By analyzing the image signal, crosstalk generated in the image signal output unit 150 or the like can be measured. Therefore, according to the present embodiment, it is possible to output an image signal for failure inspection of the image signal output unit 150 or the like.

Further, the cause of the failure may be estimated by comparing the image signal acquired by the present embodiment with the image signal acquired by locally irradiating the central portion of the pixel unit 110 with light, in general, when an error over a plurality of rows such as a transverse smear occurs, a plurality of failure causes can be considered. If there is a failure in the image signal output unit 150, an error occurs in both the video signal acquired by the present embodiment and the video signal acquired by locally irradiating the central portion of the pixel unit 110 with light. On the other hand, when there is a failure in the pixel unit 110, an error occurs only in the video signal acquired by the present embodiment. Using this, it is possible to estimate the location of a failure with respect to an error such as a transverse smear.

In the present embodiment, the number of signal lines VLINEk is assumed to be 12 for convenience of description, but is not limited to this. Even if the number of signal lines VLINEk is different, the same processing can be performed by appropriately changing the number of pulses of the selection signal φCK in the timing chart.

Eighth Embodiment

Figure 10:
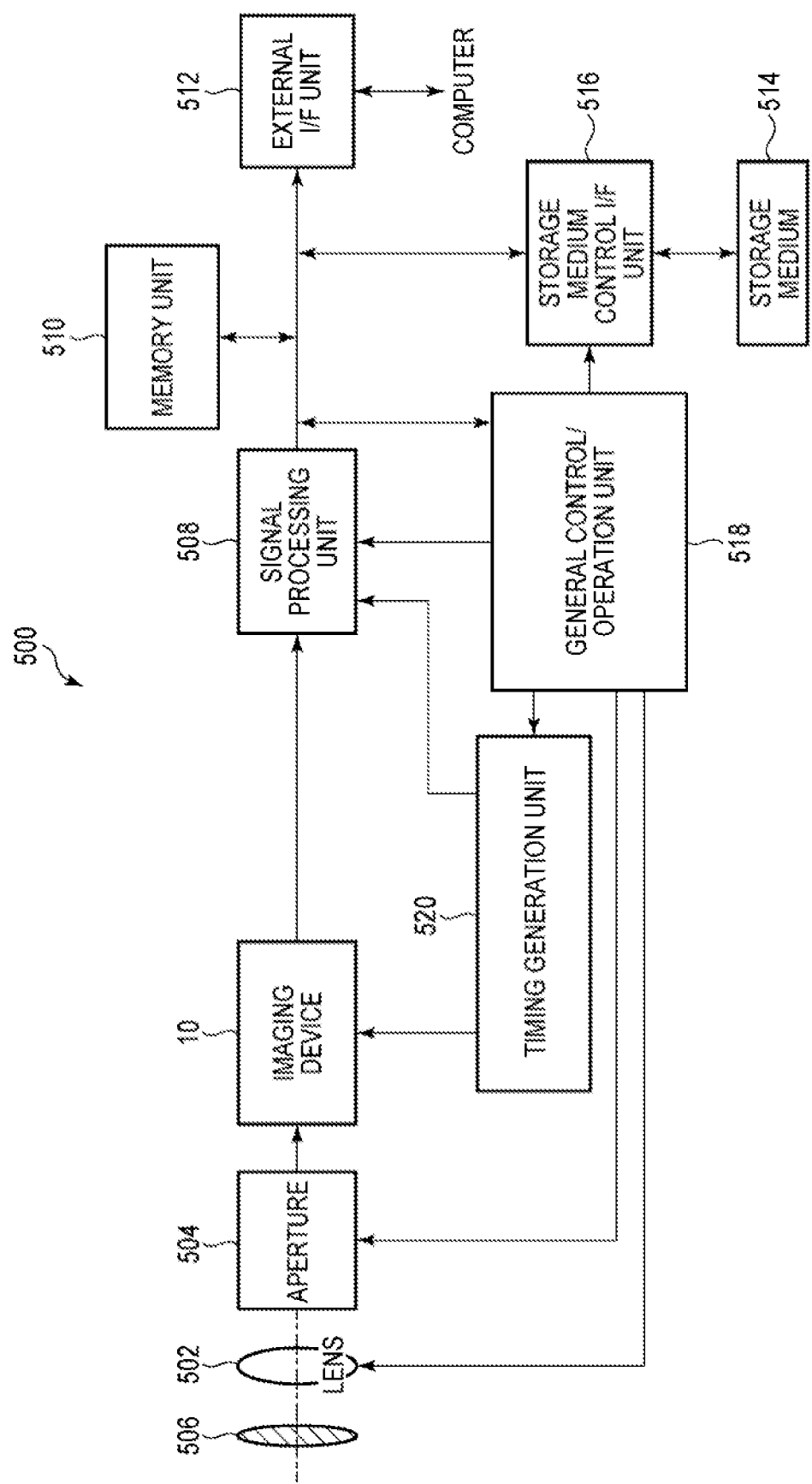
FIG. 10 is a block diagram illustrating a configuration example of an imaging system according to an eighth embodiment.

Next, an example of an apparatus to which the photoelectric conversion device 100 according to the embodiments described above is applied will be described. FIG. 10 is a block diagram illustrating the configuration of an imaging system 500 according to the present embodiment. An imaging device 10 illustrated in FIG. 10 is any one of the photoelectric conversion device 100 described in the above first to seventh embodiments. That is, the imaging system 500 according to the present embodiment is an example of a photoelectric conversion system to which the photoelectric conversion device 100 described in the above-described first to seventh embodiments can be applied. The imaging system 500 to which the imaging device 10 is applicable may be, for example, a digital camera, a digital camcorder, a surveillance camera, or the like. FIG. 10 illustrates a configuration example of a digital camera to which the imaging device 10, which is an example of the photoelectric conversion device 100 described in the above embodiments, is applied.

The imaging system 500 illustrated as an example in FIG. 10 has the imaging device 10, a lens 502 that captures an optical image of an object onto the imaging device 10, an aperture 504 for changing a light amount passing through the lens 502, and a barrier 506 for protecting the lens 502. The lens 502 and the aperture 504 form an optical system that collects a light onto the imaging device 10.

The imaging system 500 further has a signal processing unit 508 that processes an output signal output from the imaging device 10. The signal processing unit 508 performs a signal processing operation to perform various correction or compression on the input signal if necessary and output the processed input signal.

The imaging system 500 further has a buffer memory unit 510 used for temporarily storing image data therein and an external interface unit (external I/F unit) 512 used for communicating with an external computer or the like. The imaging system 500 further has a storage medium 514 such as a semiconductor memory used for performing storage or readout of imaging data and a storage medium control interface unit (storage medium control I/F unit) 516 used for performing storage or readout on the storage medium 514. Note that the storage medium 514 may be embedded in the imaging system 500 or may be removable.

Furthermore, the imaging system 500 has a general control/operation unit 518 that performs various calculation and controls the overall digital camera and a timing generation unit 520 that outputs various timing signals to the imaging device 10 and the signal processing unit 508. Herein, the timing signal or the like may be externally input, and the imaging system 500 may have at least the imaging device 10 and the signal processing unit 508 that processes an output signal output from the imaging device 10. The general control/operation unit 518 and the timing generation unit 520 may be configured to perform a part or all of the function related to control of the photoelectric conversion device 100, such as generation of a control signal, generation of a reference voltage, or the like in the embodiments described above.

The imaging device 10 outputs an image signal to the signal processing unit 508. The signal processing unit 508 performs predetermined signal processing on the image signal (signal based on the voltage potential of the pad electrode 154, 155 or the pad electrode 156) output from the imaging device 10, and outputs image data. The signal processing unit 508 generates an image by using the image signal. Further, the signal processing unit 508 or the general control/operation unit 518 may perform processing for detecting a failure of the imaging device 10 based on a voltage potential signal (voltage potential of the pad electrode 142) output from the imaging device 10. The signal processing unit 508 and the general control/operation unit 518 may be more generally referred to as a control unit.

As described above, the imaging system 500 of the present embodiment includes the imaging device 10 according to any of the first to seventh embodiments. Accordingly, the imaging system 500 that enables to perform more appropriate inspection can be realized.

Note that the imaging system 500 may have a function of correcting the influence of a failure based on the measurement result of the voltage potential signal output from the failure position such as a point flaw or a line flaw, or a function of excluding the failure position. In this case, the influence of failures such as point flaws and line flaws is reduced. This processing may be performed in the signal processing unit 508 or in the general control/operation unit 518.

Ninth Embodiment

Figure 11A:
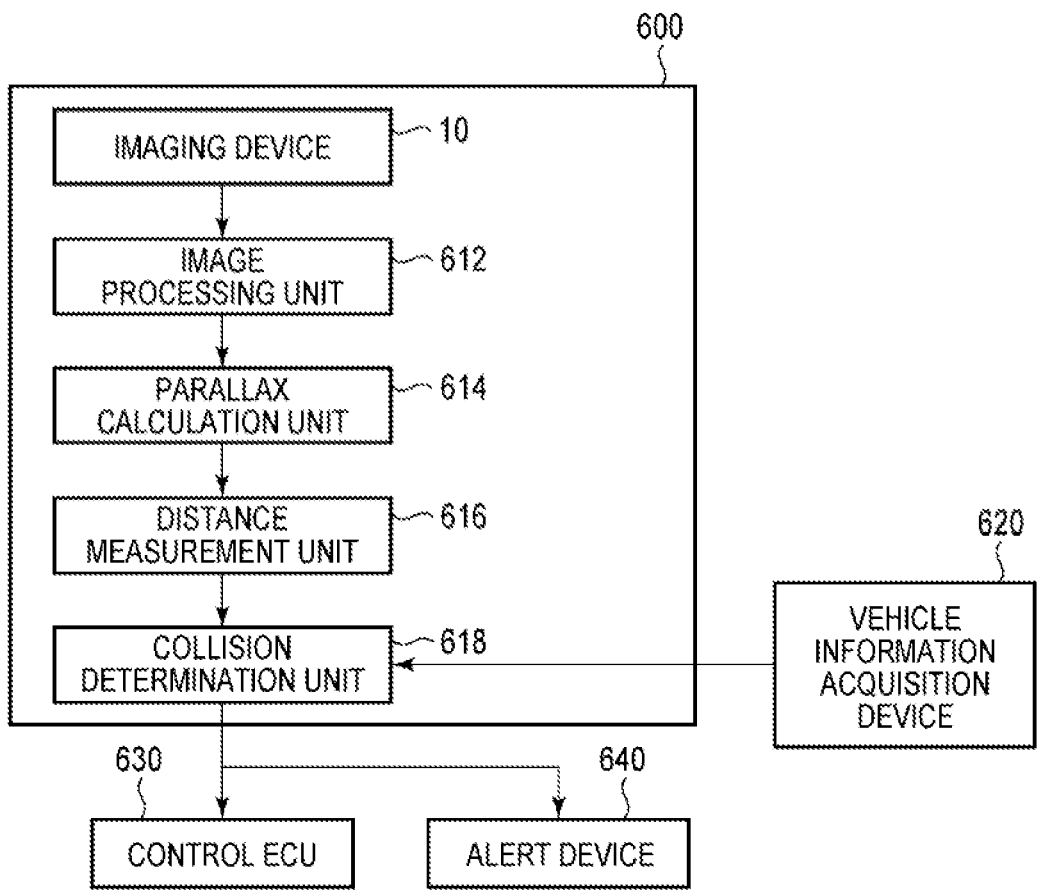
FIG. 11A and FIG. 11B are diagrams illustrating a configuration example of an imaging system and a moving body according to a ninth embodiment.
Figure 11B:
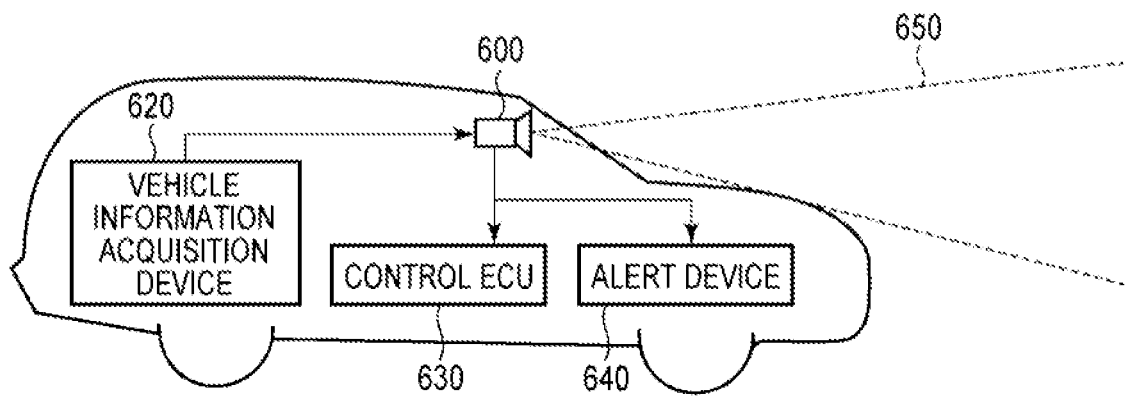

FIG. 11A and FIG. 11B are diagrams illustrating a configuration of an imaging system 600 and a moving body according to the present embodiment. FIG. 11A illustrates an example of an imaging system 600 related to an on-vehicle camera. An imaging system 600 has an imaging device 10 that is an example of the photoelectric conversion device 100 described in any of the above first to seventh embodiments. The imaging system 600 has an image processing unit 612 that performs image processing on a plurality of image data acquired by the imaging device 10 and a parallax calculation unit 614 that calculates a parallax (a phase difference of parallax images) from the plurality of image data acquired by the imaging system 600. Further, the imaging system 600 has a distance measurement unit 616 that calculates a distance to the object based on the calculated parallax and a collision determination unit 618 that determines whether or not there is a collision possibility based on the calculated distance. Herein, the parallax calculation unit 614 and the distance measurement unit 616 are an example of a distance information acquisition unit that acquires distance information on the distance to the object. That is, the distance information is information on a parallax, a defocus amount, a distance to an object, or the like. The collision determination unit 618 may use any of the distance information to determine the collision possibility. The distance information acquisition unit may be implemented by dedicatedly designed hardware or may be implemented by a software module. Further, the distance information acquisition unit may be implemented by a field programmable gate array (FPGA), an application specific integrated circuit (ASIC), or the like or may be implemented by a combination thereof.

The imaging system 600 is connected to the vehicle information acquisition device 620 and can acquire vehicle information such as a vehicle speed, a yaw rate, a steering angle, or the like. Further, the imaging system 600 is connected to a control ECU 630, which is a control device that outputs a control signal for causing a vehicle to generate braking force based on a determination result by the collision determination unit 618. That is, the control ECU 630 is an example of a moving body control unit that controls a moving body based on distance information. Further, the imaging system 600 is also connected to an alert device 640 that issues an alert to the driver based on a determination result by the collision determination unit 618. For example, when the collision probability is high as the determination result of the collision determination unit 618, the control ECU 630 performs vehicle control to avoid a collision or reduce damage by applying a brake, pushing back an accelerator, suppressing engine power, or the like. The alert device 640 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 600. FIG. 11B illustrates the configuration of the imaging system 600 when a front area of a vehicle (a capturing area 650) is captured. The vehicle information acquisition device 620 transmits an instruction to cause the imaging system 600 to operate and perform image capturing.

Since the imaging device 10 of the present embodiment is for use on a vehicle, it is used in a severe environment such as high temperature and high humidity. Therefore, point flaws, line flaws or the like may occur after shipment to the market. The occurrence of such point flaws, line flaws, or the like may affect the accuracy of object recognition. In the present embodiment, these point flaws, line flaws, or the like can be measured based on the voltage potential signal (voltage potential of the pad electrode 142) output form the voltage potential output unit 140. Accordingly, the imaging system and moving body that enable to perform more appropriate inspection can be realized. Note that this inspection process may performed, for example, in the image processing unit 612.

Note that the imaging system 600 may have a function of correcting the influence of a failure based on the measurement result of the voltage potential signal output from the failure position such as a point flaw or a line flaw, or a function of excluding the failure position. In this case, the influence of failures such as point flaws and line flaws is reduced. This processing may be performed in the image processing unit 612.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving body (moving apparatus) such as a ship, an airplane, or an industrial robot, for example. In addition, the imaging system can be widely applied to a device which utilizes object recognition, such as an intelligent transportation system (ITS), without being limited to moving bodies.

Other Embodiment

The application of the technique disclosed in the above embodiments is not limited to photoelectric conversion devices. For example, the present technique is applicable to an electronic device having a cell array unit in which cells are arranged in a plurality of rows and a plurality of columns, and in which each of the plurality of cells inputs or outputs a signal via a signal line arranged corresponding to the plurality of columns or the plurality of columns. Examples of such electronic devices include, in addition to photoelectric conversion devices, display devices such as a liquid crystal display and an OLED display, and memory devices such as a DRAM, an SRAM, and a flash memory. The cell array unit has a plurality of cells arranged in a plurality of rows and a plurality of columns. Each of the plurality of cells may have a cell circuit including a transistor. Each of the plurality of cells in the cell array unit of the above example is a pixel cell including a pixel circuit (cell circuit) having a photoelectric conversion unit. The cells of the cell array unit are not limited to a pixel cells but may be memory cells. A cell array unit having a plurality of pixel cells can be called a pixel array unit or a pixel unit. In the cell array unit, cell circuits are arrayed two-dimensionally over a plurality of rows and a plurality of columns. Each column of the cell array unit is provided with at least one signal line connected to the cell circuits arranged in the corresponding column. A pixel circuit having a photoelectric conversion unit has, for example, a gate of a transfer transistor, a gate of a reset transistor, and a selection transistor, and a pixel signal is output to a signal line via the selection transistor. Since the signal from the cell circuit is output to the signal line, the signal line can be referred to as an output line. Since the signal lines are arranged in corresponding rows, the signal lines can also be referred to as column lines. Each row of the cell array unit is provided with at least one signal line (not illustrated) connected to a cell circuit arranged in a corresponding row. The signal lines (not illustrated) connected to the cell circuits arranged in the corresponding rows are, for example, four signal lines connected to the gate of the transfer transistor, the gate of the reset transistor, and the gate of the select transistor. Since the signal to the cell circuit is input from the signal line, the signal line can be called an input line. Since the input line is arranged in the corresponding row, the input line can also be referred to as a row line. The row line and the column line include, in addition to signal lines such as input lines and output lines, power supply lines for supplying a ground voltage potential or a drive voltage potential.

The pixel unit 110 of the above-described embodiment is an example of a cell array unit, the pixel 111 is an example of a cell, and the signal line VLINEk is an example of a signal line. In the case of a display device, the cell corresponds to a display element such as a pixel or a sub-pixel, and the signal line corresponds to a data line or an address line. In the case of a display device, an image signal input unit is used instead of the image signal output unit 150. In a memory device, the cell corresponds to a memory cell, and the signal line corresponds to a bit line or a word line. The image signal output unit 150 or the image signal input unit may have a conversion circuit for converting one of the analog signal and the digital signal into the other of the analog signal and the digital signal.

In the example of a display device, a memory device, or the like, a configuration in which a pad electrode is provided so as to be electrically connected to some signal lines selected based on a selection signal can be realized in the same manner as the embodiment of the photoelectric conversion device described above. Thus, a voltage potential can be directly input or output to/from a selected part of the plurality of signal lines via the pad electrode. Therefore, in this modified embodiment, as in the above-described embodiment, an electronic device capable of more appropriately inputting or outputting a signal can be realized. The fact that the voltage potential or signal passes via the pad electrode means that the voltage potential or signal is input or output via the pad electrode.

Further, in the above-mentioned ninth embodiment, the moving body control means for controlling the moving body and the moving body based on the information acquired by the imaging device 10 is disclosed, but the present invention is not limited to this. This technique is applicable to the overall system including the electronic device described above and a drive unit for driving a machinery device such as a mobile unit based on information acquired from the electronic device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, examples in which a part of the configuration of one embodiment is added to another embodiment, or examples in which a part of the configuration of another embodiment is replaced are also embodiments of the present invention. Note that contents disclosed in this specification include not only contents described in this specification but also all items that can be grasped from this specification and the accompanying drawings of this specification. The contents disclosed in this specification include a complementary set of concepts described in this specification. That is, if, for example, "A is B" is described in this specification, this specification is considered to disclose "A is not B" even if a description of "A is not B" is omitted in this specification. This is because if "A is B" is described, the inventor has taken a case in which "A is not B" into consideration, as a matter of course.

This application claims the benefit of Japanese Patent Application No. 2020-040913, filed Mar. 10, 2020, which is hereby incorporated by reference herein in its entirety.

What is claimed is:

1. An electronic device comprising:
   a cell array unit in which cells are arranged in a plurality of rows and a plurality of columns;
   a plurality of signal lines, each of the plurality of signal lines being arranged corresponding to one of the plurality of rows or the plurality of columns and being connected to corresponding cells;
   a first electrode via which a signal according to a signal transmitted via at least one of the plurality of signal lines passes;
   a second electrode to which a selection signal is input to select a part of the plurality of signal lines; and
   a third electrode that is electrically connected to a node between cells that are connected to the part of the plurality of signal lines selected based on the selection signal and the first electrode,
wherein a voltage potential of the third electrode correlates with a voltage potential of the part of the plurality of signal lines selected based on the selection signal.

2. The electronic device according to claim 1 further comprising a selection circuit that is connected to the second electrode,
wherein the selection circuit includes a plurality of switches, each of the plurality of switches being arranged corresponding to one of the plurality of columns, and a shift register that controls the plurality of switches.

3. The electronic device according to claim 1, wherein the part of the plurality of signal lines selected based on the selection signal is a signal line according to the number of pulses included in the selection signal.

4. The electronic device according to claim 1 further comprising a buffer circuit that is arranged between the node and the third electrode.

5. The electronic device according to claim 1 further comprising an amplifying circuit that is arranged between the node and the third electrode,
wherein the amplifying circuit amplifies a voltage potential of the node.

6. The electronic device according to claim 1 further comprising a conversion circuit that is arranged between the node and the first electrode,
wherein the conversion circuit converts an analog signal into a digital signal.

7. The electronic device according to claim 1 further comprising a first circuit that is arranged between the node and the first electrode and a second circuit that is arranged between the node and the third electrode.

8. The electronic device according to claim 7 further comprising a first component and a second component that are laminated each other,
wherein the cell array unit is arranged in the first component, and
wherein the first circuit is arranged in the second component.

9. The electronic device according to claim 8 wherein the second circuit is arranged in the second component.

10. The electronic device according to claim 1, wherein each of the cells includes a photoelectric conversion element or a display element.

11. The electronic device according to claim 1, wherein the second electrode is a node receiving a control pulse from a control circuit.

12. The electronic device according to claim 1, wherein the first electrode is used for generating an image signal and the second electrode and the third electrode are used for detecting a failure of the electronic device.

13. A system comprising:
the electronic device according to claim 1; and
a processing unit configured to process the signal that passes the first electrode.

14. A system comprising:
the electronic device according to claim 1; and
a drive unit configured to drive a machinery device based on information acquired from the electronic device.

15. A system comprising:
the electronic device according to claim 1; and
a control unit that is connected to the second electrode and the third electrode.

16. The system according to claim 15, wherein the control unit detects a failure of the electronic device based on a voltage potential of the third electrode.

17. The system according to claim 16, wherein, upon detection of the failure, the control unit performs a process to correct influence of the failure or a process to exclude a portion in which the failure occurs.

18. An electronic device comprising:
a cell array unit in which cells are arranged in a plurality of rows and a plurality of columns;
a plurality of signal lines, each of the plurality of signal lines being arranged corresponding to one of the plurality of rows or the plurality of columns and being connected to corresponding cells;
an image signal output unit that includes a first electrode being a pad via which a digital signal according to an analog signal transmitted via at least one of the plurality of signal lines passes; and
a voltage potential output unit arranged in an electrical path between the cell array unit and the image signal output unit,
wherein the voltage potential output unit includes:
a plurality of switches being a selection circuit configured to select a part of the plurality of signal lines; and
a second electrode being a pad via which an analog signal according to an analog signal transmitted via the part of the plurality of signal lines selected by the selection circuit passes.

19. The electronic device according to claim 18, wherein each of the cells includes a photoelectric conversion element or a display element.

20. The electronic device according to claim 18, further comprising a third electrode which is a pad to which a selection signal is input, from outside of the electronic device, to select a part of the plurality of signal lines.

21. The electronic device according to claim 18, further comprising:
a third electrode to which a selection signal is input to select a part of the plurality of signal lines; and
a control circuit configured to control the selection circuit, wherein the selection signal input to the third electrode is a control signal output from the control circuit.

22. A method of controlling an electronic device including a cell array unit in which cells are arranged in a plurality of rows and a plurality of columns, a plurality of signal lines, an image signal output unit that includes a first electrode being a pad via which a digital signal according to an analog signal transmitted via at least one of the plurality of signal lines passes, a plurality of switches being a selection circuit configured to select a part of the plurality of signal lines, and a second electrode being a pad via which an analog signal according to an analog signal transmitted via the part of the plurality of signal lines selected by the selection circuit passes, each of the plurality of signal lines being arranged corresponding to one of the plurality of rows or the plurality of columns and being connected to corresponding cells,
the method comprising:
outputting a digital signal based on a voltage potential of at least one of the plurality of signal lines from the first electrode; and
acquiring an analog signal based on a voltage potential of a part of the plurality of signal lines from the second electrode.

23. The method according to claim 22 further comprising detecting a failure of the electronic device based on the analog signal.

24. The method according to claim 23 further comprising, upon detection of the failure, performing a process to correct influence of the failure or a process to exclude a portion in which the failure occurs.

25. The method according to claim 22, wherein each of the cells includes a photoelectric conversion element or a display element.

26. The method according to claim 22, the electronic device further comprising a third electrode to which pulses are input, the method further comprising:
selecting the part of the plurality of signal lines according to the number of pulses input to the third electrode.

27. The method according to claim 22, the electronic device further comprising a third electrode being a pad to which pulses are input, from outside of the electronic device, the method further comprising:
selecting the part of the plurality of signal lines according to the number of pulses input to the third electrode.

28. The method according to claim 22, the electronic device further comprising a control circuit and a third electrode to which pulses are input from the control circuit, the method further comprising:
selecting the part of the plurality of signal lines according to the number of pulses input to the third electrode.

* * * * *